United States Patent [19]

Hodge et al.

[11] 4,322,052
[45] Mar. 30, 1982

[54] LATCH ASSEMBLY-REVERSIBLE SEAT

[75] Inventors: Norman J. Hodge, Peoria; John S. Logsdon, Chillicothe, both of Ill.

[73] Assignee: Caterpillar Tractor Co., Peoria, Ill.

[21] Appl. No.: 173,201

[22] PCT Filed: Feb. 22, 1980

[86] PCT No.: PCT/US80/00181

§ 371 Date: Feb. 22, 1980

§ 102(e) Date: Feb. 22, 1980

[51] Int. Cl.³ .............................. B60N 1/02; B60N 1/08
[52] U.S. Cl. .................................... 248/420; 180/330; 296/65 R; 297/94; 297/95
[58] Field of Search ...................... 248/420, 421, 419; 297/103, 101, 104, 94, 97, 95; 180/330, 331; 296/65 R

[56] References Cited

U.S. PATENT DOCUMENTS

| | | | |
|---|---|---|---|
| 542,411 | 7/1895 | Johnston | 297/97 X |
| 805,802 | 11/1905 | Kohout | 297/95 |
| 1,196,902 | 9/1916 | Thompson | 297/95 X |
| 1,214,124 | 1/1917 | Bennett | 297/95 X |
| 1,298,123 | 4/1919 | Taylor | 297/103 X |
| 1,364,756 | 1/1921 | Henry | 297/103 |
| 2,883,774 | 4/1959 | Clifford | 180/330 X |
| 3,300,172 | 1/1967 | Noller et al. | 248/421 X |
| 3,313,570 | 4/1967 | McVeigh | 297/103 |
| 3,642,088 | 2/1972 | Smith | 180/331 |
| 3,853,373 | 12/1974 | Corbett | 297/341 |
| 4,081,051 | 3/1978 | Logsdon | 180/331 |
| 4,081,051 | 3/1978 | Logsdon | 297/94 X |
| 4,209,158 | 6/1980 | Pickles | 248/421 |
| 4,222,543 | 9/1980 | Gedig et al. | 248/421 X |

FOREIGN PATENT DOCUMENTS

| | | | |
|---|---|---|---|
| 1091569 | 12/1980 | Canada | 297/95 |
| 1063113 | 12/1953 | France | 297/95 |

Primary Examiner—James T. McCall
Attorney, Agent, or Firm—O. Gordon Pence

[57] ABSTRACT

Recurring problems associated with the manufacturing tolerances of the links, slides, rollers and other componentry forming the carriages for adjustable and reversible seats are such that, after assembly, an undesirable and annoying amount of movement or "play" is introduced in the seat. The present invention is an improved latch assembly (15) for locking a vehicle operator's seat assembly (10) in either a forward or a reverse operating position (12,13) and includes a cam (92) selectively positionable in response to movement of the seat assembly (10) and an arm assembly (108) and a pin (118) for releasably engaging the cam (92) and cooperating therewith in locking the seat assembly (10) in position.

9 Claims, 4 Drawing Figures

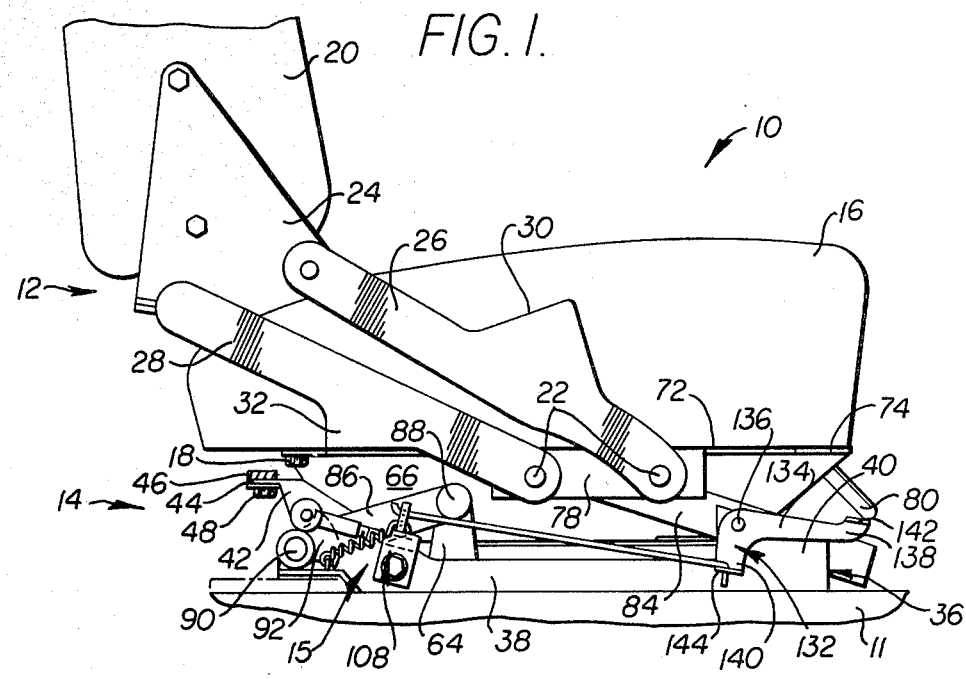
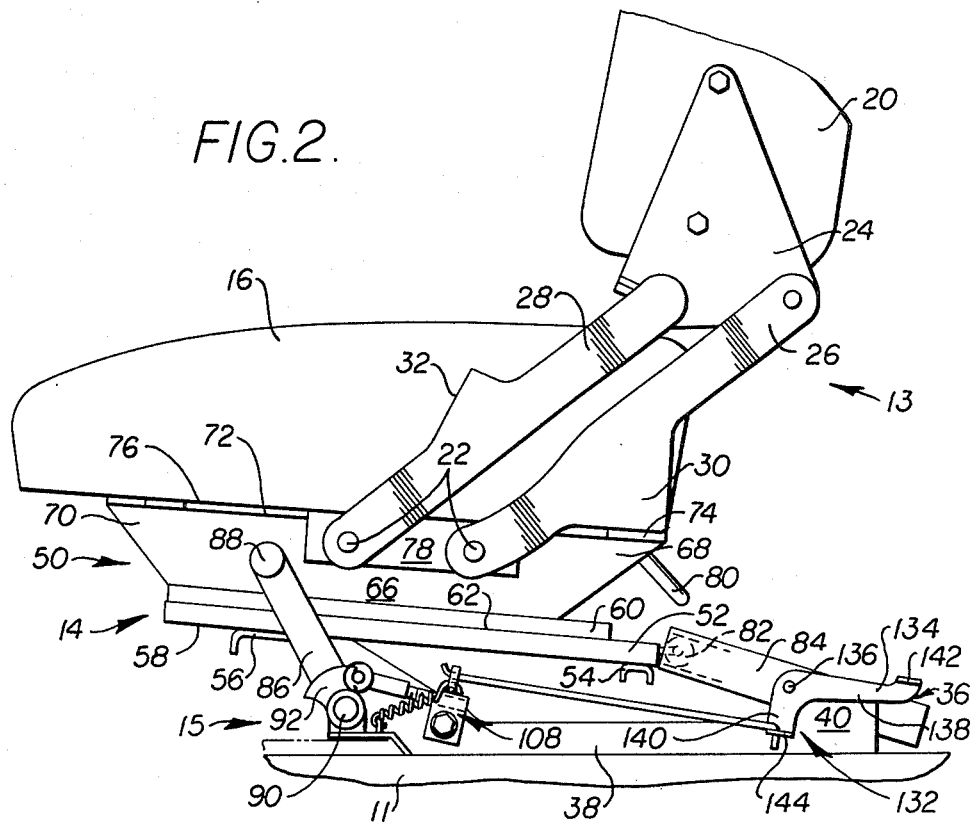

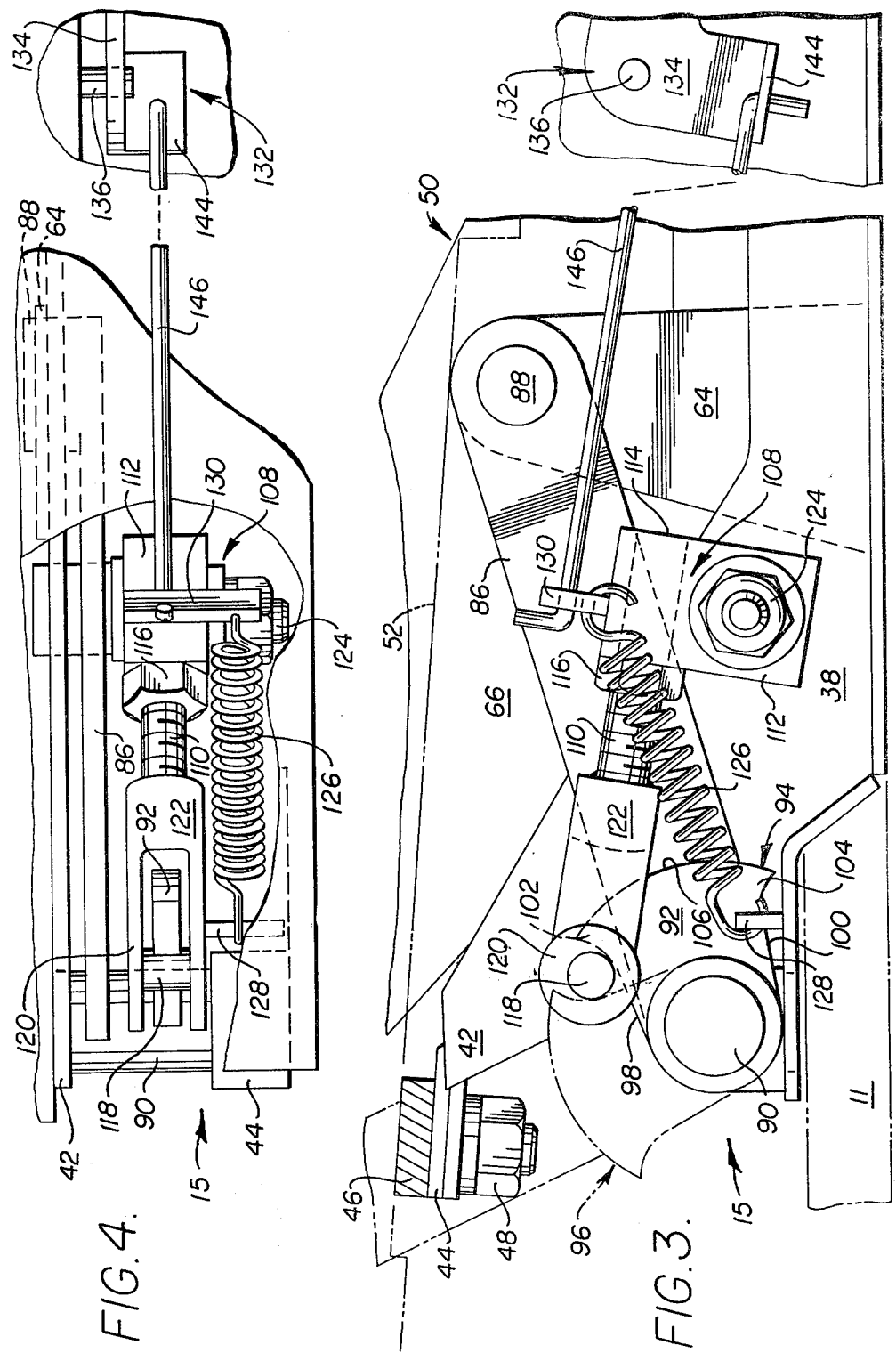

LATCH ASSEMBLY-REVERSIBLE SEAT

TECHNICAL FIELD

This invention relates generally to latch assemblies and, more particularly, to a latch assembly for locking an adjustable and reversible seat in its forward and reverse positions.

BACKGROUND ART

Tractors and other earthmoving vehicles equipped with implements and associated controls mounted both to the front and to the rear of the operator's compartment or platform are well-known in the art. For example, U.S. Pat. No. 4,081,051 to John S. Logsdon, issued Mar. 28, 1978 and assigned to the assignee of the present invention discloses a track-type vehicle having an implement such as a backhoe mounted behind the operator's platform. A dual control arrangement is also shown with one of the controls mounted to the front of the operator's compartment for steering the tractor or for operating the forwardly located implement, and with the other of the controls mounted to the rear of the operator's compartment for operating the backhoe.

The location of the backhoe controls, being higher above the operator's platform than the front mounted controls, is such that for the operator to run the backhoe efficiently, he must be able to sit facing it in a position which is elevated with respect to the forward operating position. To this end, there is provided a seat with a back mounted for movement between positions at opposite transverse margins of the seat. The seat is mounted upon an adjustable carriage, having a front portion supported on rollers in a pair of parallel channels or tracks and a rear portion carried by a pair of supporting links. A manual lever is operatively connected to the carriage so that it can swing the rear of the carriage upwardly and rearwardly by pivoting it on the supporting links. At the same time the rollers at the front of the carriage move rearwardly in the tracks.

However, the seats of the prior art do not fully satisfy the requirements for an adjustable and reversible seat. The manufacturing tolerances of the links, slides, and rollers forming the adjustable carriage are such that after assembly, an undesirable amount of movement or "play" is introduced into the carriage. This "play" in the carriage translates into an undesirable and annoying amount of movement of the seat, particularly in the rearward, elevated position, which interferes with efficient operation of the vehicle. Further, this condition is aggravated over a period of time as repeated use and movement of the seat wears and thereby loosens the carriage.

The foregoing illustrates limitations of the known prior art. Thus, it is apparent that it would be advantageous to provide an alternative to the prior art.

DISCLOSURE OF THE INVENTION

In one aspect of the present invention this is accomplished by providing a latch assembly for securing a vehicle operator's seat assembly in either a first or a second position relative to the vehicle and includes a cam selectively positionable in response to movement of the seat assembly, and an arm assembly including a pin for releasably engaging the cam and cooperating therewith in locking the seat assembly in its selected positions.

The foregoing and other aspects of the instant invention will become apparent from the following detailed description of the invention when considered in conjunction with the accompanying drawings. It is to be expressly understood, however, that the drawings are not intended as a definition of the invention but are for purposes of illustration only.

BRIEF DESCRIPTION OF THE DRAWINGS

In the drawings:

FIG. 1 is a side elevational view of a vehicle operator's seat embodying the present invention illustrated in the forward operating position;

FIG. 2 is a side elevational view of the vehicle operator's seat of FIG. 1 illustrated in the rearward operating position;

FIG. 3 is an enlarged side elevational view of an embodiment of the present invention; and FIG. 4 is a top horizontal view of the embodiment as shown in FIG. 3 having portions removed to better illustrate the elements thereof.

BEST MODE FOR CARRYING OUT THE INVENTION

While the instant invention has general application as a latch assembly, for convenience of illustration the preferred embodiment will be described with reference to a latch assembly for an operator's seat mounted on a dual purpose vehicle. By way of example, a latch assembly constructed according to the teachings of the present invention may be used with an operator's seat on a track-type loader or dozer having a rear mounted implement, although it is not intended to be limited thereto.

Referring now to the drawings, an adjustable and reversible seat assembly indicated generally by the numeral 10 and adapted for use with a dual purpose vehicle, a portion of which is shown at 11, is depicted from one side in a forward operating position 12 in FIG. 1 and in a rearward operating position 13 in FIG. 2. The seat assembly includes an adjustable carriage shown generally at 14, a latch assembly illustrated generally at 15, a seat 16 attached to the carriage by suitable fastening means, for example a bolt 18, and a reversible back 20 pivotally connected at 22 to the carriage by a bracket 24 and a pair of links 26,28, each link having a stop 30,32.

The carriage 14 includes a lower carriage subassembly 36 having longitudinal side beams 38 mounted to the vehicle 11 and spaced apart by a forward and a rearward cross beam (not shown) forming a rigid, rectangular structure. The longitudinal side beams each have a raised flange 40 extending upwardly from the forward end and a flange or ear 42 extending upwardly and rearwardly from the back end at a substantially 45° angle from the top plane of the vehicle. A laterally extending plate 44 interconnects the rear flanges providing additional support therefor and includes at least one stop or seat rest 46 bolted thereto at 48.

As illustrated most clearly in FIG. 2, an upper carriage subassembly 50 includes a generally rectangular base 52 which may, for example, be formed from rolled steel plate. A pair of laterally extending channel supports 54,56 are secured to the respective front and rear portions of the bottom surface 58 of the base 52 to support it on the vehicle 11 when the seat assembly is in the forward operating position 12. A reinforcing plate 60 is mounted to the top surface 62 of the base, and an upwardly extending flange 64 is secured to the rear portion of the top surface adjacent each side of the reinforcing plate. A pair of upright plates 66 having generally longitudinally upwardly and outwardly extending front and rear end portions 68,70 are secured to the reinforcing plate. A seat mounting member 72, including front and rear laterally outwardly extending ears or stops 74,76 and a pair of oppositely disposed, side mounted, longitudinally and downwardly extending seat back mounting brackets 78, is fastened to the upright plates. A handle 80 is secured to the forward portion thereof to assist the operator in changing the seat assembly position, as will be described hereinafter in greater detail.

The upper and lower carriage subassemblies 36,50 are pivotally interconnected at the front by a pair of rollers 82 rotatably disposed in a pair of parallel channels or tracks 84, each track being connected to the raised flanges 40 extending upwardly from the forward ends of each of the longitudinal side beams 38. The subassemblies are pivotally interconnected at the rear by a pair of oppositely disposed parallel links 86 each pinned at 88 to one of the upwardly extending flanges 64 and at 90 to one of the longitudinal side beams.

Referring now to FIGS. 3 and 4, the latch assembly 15 for locking the seat assembly 10 in either the forward or in the reverse operating position 12,13 is shown in greater detail. The latch assembly includes a cam 92 secured to the pin 90 connecting one of the links 86 to the lower carriage assembly 36 and is constructed and arranged so as to move between a forward locking position at 94 to a rearward locking position shown in phantom at 96 in response to movement of the seat assembly between the forward and the rearward operating positions. The cam includes first and second locking surfaces 98,100 each having an outwardly extending locking lobe 102,104 respectively; the locking surfaces further being interconnected by a third, generally curvilinear guide surface 106.

An adjustable arm assembly 108 cooperates with the cam 92 in locking the seat assembly 10 in either the forward or the rearward operating position 12,13 and includes a rod 110 threadably inserted into a block 112 at a first end 114 and secured thereto by a threaded lock unt 116. A pin 118 is secured to a second end 120, which, by way of example may be in the form of a yoke 122 connected to the rod. The block is pivotally secured by a bolt 124 to the longitudinal side beam 38, and the pin is urged into releasable locking engagment with the cam 92 by suitable biasing means, for example a coil spring 126. The spring is secured by a bracket 128 to the carriage and extends upwardly to a second bracket 130 where it is secured to the block.

Referring again to FIGS. 1 and 2, means for remotely disengaging the pin 118 and the cam 92 are depicted generally by the numeral 132. The disengaging means includes a generally L-shaped lever 134 pivotally connected to the carriage at 136. The lever includes a first leg 138 and a second leg 140; the first leg being longer than the second leg and having a substantially flat, outwardly extending lift arm 142 at one end so positioned as to be easily accessible to the vehicle operator. The second leg includes flange or ear 144 extending substantially transversely outwardly therefrom to which is secured suitable means 146 for interconnecting the lever and the arm assembly 108. For purposes of illustration, in the embodiment shown, a rod 146 extends from the ear 144 to the bracket 130 mounted on the block 112 interconnecting the two elements.

INDUSTRIAL APPLICABILITY

With the parts assembled as set forth above, the improved latch assembly 15 of the present invention has general applicability wherever it is required to lock a seat assembly in a fixed position. One such application is to lock an adjustable and reversible operator's seat assembly for a dual purpose vehicle in either a forward or in a reverse operating position.

An operator's seat assembly 10 secured to an adjustable carriage 14 is shown in the forward operating position 12 in FIG. 1 where it is located in the most efficient and convenient positional relationship for the operator and the controls for steering the vehicle and manipulating a forwardly mounted implement. The seat assembly is locked in the forward operating position by the latch assembly 15. More particularly and as best illustrated in FIG. 3, with the cam 92 in the forward locking position 94, the force of the spring 126 being exerted on the arm assembly 108 urges the pin 118 into releasable locking engagement with the locking surface 98 and associated locking lobe 102 of the cam.

When it is necessary to operate an implement and associated controls mounted to the rear of the vehicle 11, the operator's seat assembly 10 is advantageously shifted to a reverse operating position 13 relative to the vehicle. This is accomplished by shifting the back 20 to the reverse operating position as determined by the cooperating stops 30,74 as shown in FIG. 2. A lift force is then applied to the lift arm 142 and associated lever 134 which is transmitted via the rod 146 to the arm assembly 108 thereby disengaging the cam 92 and the pin 118. The seat 16 and upper carriage subassembly 50 are shifted rearwardly and upwardly by the operator applying the shifting force to the handle 80. In response to movement of the seat and carriage, the cam rotates a preselected distance to the rearward locking position 96 shown in phantom in FIG. 3. During movement of the seat and corresponding movement of the cam between the forward and rearward locking positions, the operator may either continue to apply the lift force to the lift arm 142 and reverse the seat with the pin and cam being free from contact with one another. Alternately, the operator may release the lift arm. The spring force will then urge the pin into engagement with the generally curvilinear surface 106 which will guide the pin over the locking lobe 104 and into releasable locking engagement therewith and with the second locking surface 100 of the cam. When it is desirable to again operate the vehicle of the forwardly mounted implement, the seat may be returned to the forward operating position 12 by reversing the above procedure.

It is to be noted that when the seat assembly 10 is in the reverse operating position 13, the seat and upper carriage subassembly 16,50 are supported in the rear by the stops or seat rests 46 secured to the plate 44 extending between the rear flanges 42 of the longitudinal side beams 38. The seat and upper carriage subassembly are supported in the front by the rollers 82 and the channels or tracks 84 secured to the raised flanges 40. In comparison, the seat and carriage assembly is entirely supported on the vehicle when in the forward operating position 12. It can be seen that the seat in the former position is less rigidly supported than in the latter and therefor more unstable and succeptable to vehicle vibrations and shifting due to loose or worn pin and link connections in the carriage. Therefore, the overall length of the arm assembly 108 can be adjusted to any length necessary to compensate for the aforementioned conditions by loosening the threaded lock nut 116 positioned on the rod 110, adjusting the length of the rod extending from the block 112, and tightening the lock nut against the block to secure the rod therein.

While the present invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiments disclosed, but that the invention will include all embodiments falling within the scope of the appended claims.

We claim:

1. In a latch assembly of an adjustable carriage (14) for changing the position of an operator's seat assembly (10) of a vehicle (11) between first and second positions (12,13) relative to said vehicle (11), the improvement comprising:

a cam (92) operatively connected to said carriage (14) and movable between first and second preselected positions (94,96), respectively, in response to movement of said seat assembly (10) to a corresponding one of said first and second positions (12,13);

an arm assembly (108) having first and second ends (114,120), and an overall length between said ends 114,120, said first end (114) being pivotally connected to said carriage (14) and said second end having a pin (118) in releasable locking engagement with said cam (92) and cooperating with said cam (92) to lock the seat assembly (10) in said first and second positions (12,13);

means (126) for biasing said pin (118) in a preselected direction into said releasable locking engagement with said cam (92); and means (110,112,116) for adjusting the overall length of said arm assembly 108.

2. The apparatus 14 of claim 1 wherein said length adjusting means (110,112,116) includes a rod (110), a block (112) and a threaded lock nut (116), said rod (110) being threadably inserted in said block (112) and having a preselected length extending outwardly from said block 112, and said threaded lock nut (116) being positioned on the rod (110) to secure the rod (110) in the block (112).

3. The apparatus (14) of claim 2 wherein the block (112) is pivotally connected to the carriage (14).

4. The apparatus (14) of claim 1 wherein the cam (92) has first and second surfaces (98,100), the pin (118) being in releasable locking engagement with the first surface (98) when the cam is in the first preselected position (94) and in releasable locking engagement with the second surface (100) when the cam (92) is in the second preselected position (96).

5. The apparatus (14) of claim 4 wherein the cam (92) has first and second lobes (102,104) cooperating with the first and second surfaces (98,100) in locking the seat assembly (10) in a respective one of the first and the second positions (13,15) relative to the vehicle (11).

6. The apparatus (14) of claim 4 wherein the cam (92) includes a third generally curvilinear surface (106) interconnecting the first and second surfaces (98,100) for guiding the pin (118) between said first and second surfaces (98,100).

7. The apparatus (14) of claim 1 including means (132) for remotely disengaging the pin (118) and the cam (92).

8. The apparatus (14) of claim 6 wherein the disengaging means (132) comprises a lever (134) operatively connected to the carriage (14) and means (146) interconnecting the lever (134) and the arm assembly (108).

9. The apparatus (14) of claim 1 wherein the biasing means (126) is in the form of a spring (126).

* * * * *